United States Patent [19]

Watanabe et al.

[11] Patent Number: 5,794,251

[45] Date of Patent: Aug. 11, 1998

[54] INFORMATION FILE PROCESSING APPARATUS AND METHOD

[75] Inventors: Ikuo Watanabe; Toshinori Yamamoto, both of Yokohama, Japan

[73] Assignee: Canon Kabushiki Kaisha, Tokyo, Japan

[21] Appl. No.: 457,105

[22] Filed: Jun. 1, 1995

[30] Foreign Application Priority Data

Jun. 6, 1994 [JP] Japan .................................. 6-123646
Jun. 7, 1994 [JP] Japan .................................. 6-125103

[51] Int. Cl.⁶ .................................................. G06F 17/30
[52] U.S. Cl. ........................... 707/200; 707/1; 707/203; 707/104
[58] Field of Search ................................ 395/600, 617, 395/182.04; 371/40.1; 358/444; 379/67; 707/200–203, 104

[56] References Cited

U.S. PATENT DOCUMENTS

4,875,159 10/1989 Cary et al. ........................ 364/200
5,155,849 10/1992 Westfall et al. ................... 395/600
5,291,306 3/1994 Watanabe et al. ................. 358/444
5,499,358 3/1996 Nevarez ........................... 395/600
5,544,176 8/1996 Fujii .............................. 371/40.1
5,555,288 9/1996 Wilson et al. ..................... 379/67
5,600,834 2/1997 Howard .......................... 395/617
5,604,862 2/1997 Midgely et al. ................ 395/182.04
5,613,107 3/1997 Villette et al. ................... 395/617

*Primary Examiner*—Thomas G. Black
*Assistant Examiner*—Cheryl Lewis
*Attorney, Agent, or Firm*—Morgan & Finnegan, L.L.P.

[57] ABSTRACT

A multimedia program is formed of different media information files together with a sequencing program controlling the order the time duration for reproducing the media information files. Versions of a file having different language attributes are packaged with other files so that these other files need be stored only once. An editing program suggests a reproduction time for an accompanying main file to be reproduced in accordance with the longest reproduction time of the versions of the file having different attributes.

20 Claims, 9 Drawing Sheets

INFORMATION FILE PROCESSING APPARATUS AND METHOD

BACKGROUND OF THE INVENTION

1. Field of the Invention

The present invention relates to an information file processing apparatus such as an apparatus for forming a program by using an information file having a plurality of information transmission media such as a still image, characters, an image, and an audio as constituent elements, an accumulation apparatus for accumulating the program in an accumulation medium, and an apparatus for reproducing the program from the medium, and an information file processing method.

2. Related Background Art

A general method of forming a multimedia program using various information files will be sequentially described below.

(1) Formation/Acquisition of Materials

Materials including a still image, characters, an image, a narration audio, and a BGM (BackGround Music) are input from a scanner, a keyboard, a video camera, a microphone, an A/C converter for audio, and the like. These materials are individually accumulated in a mass storage, generally, in a hard disk.

(2) Formation of Continuity

The materials (files) obtained in step (1) are combined with each other. For example, a combination of a certain image and a certain narration, and a presentation order are considered. This idea is arranged as a pictorial continuity as one program and described together with a lap time from the start point of the program.

(3) Formation of Program Sequence File (Scenario File)

With reference to the continuity formed in step (2), a program sequence for controlling the progress of the program is coded, thereby forming a program sequence file. In reproduction of the multimedia program, this program sequence file is read by the sequencer of a multimedia reproduction system to control reproduction of the program.

More specifically, in reproduction, this program sequence file is used to reproduce the program while recognizing an image display order, or an audio reproduction order at specific timings.

(4) Packaging

The target program is finally completed, actually reproduced from the hard disk, and confirmed. Thereafter, only the program sequence file and the material files including a still image, characters, an image, and an audio used in the program sequence file are written in the hard disk while being interleaved in units of blocks such as packets and sectors. The target program is finally completed, actually reproduced from the hard disk, and confirmed. Thereafter, this program is written in a storage with a small capacity, such as a MOD and a CD-ROM. Particularly, to press a CD-ROM, a lot of cost and time are required. For this reason, another storage, e.g., a write-once proof disk is prepared first, and the program is actually reproduced using this storage, thereby confirming that the program can also be properly reproduced from a CD-ROM. Thereafter, a CD-ROM is actually pressed.

In reproduction of a general multimedia program, the operator selects a desired multimedia program by using an operation unit such as a key/mouse and designates reproduction. A package in which the designated program is described is read out, and the files are sequentially reproduced from the package.

In the above system, when the narration audio and the explanatory characters are to be changed to another language, e.g., English, the materials of the narration audio and the explanatory characters are formed again in English. These materials are accumulated in the hard disks as files. At the same time, similar material files are acquired and packaged to form a program corresponding to the other language, resulting in cumbersome operations. In addition, storage of such a large number of packages in a CD-ROM also results in an increase in cost. Furthermore, to cope with, e.g., five languages, five disks must be formed and stored, resulting in a large decrease in management efficiency.

In the above system, when a package medium is to be formed, formation of the continuity in step (2) and formation of the program sequence file (scenario file) in step (3) are performed from the above formation procedures. If this editing operation is to be executed in a short time, the time length of each material file such as a still image, characters, an image, a narration audio, and a BGM must be clearly defined in advance. For example, in formation of the continuity in step (2), the editor must determine the reproduction time of each material file on the basis of the time length of the material file while considering the entire scenario including the visual effect. This operation requires advanced skills, as a matter of course.

In addition, when five languages are prepared for a narration for explaining a still image, and the reproduction time of the still image is determined on the basis of the narration time in each language, five programs in different languages must be formed as final programs. Similarly, when three images are prepared as inserted images for explaining the still image as main reproduction information, three different programs for corresponding these images are necessary. That is, the editing operation must be repeated in correspondence with the number of languages or the number of inserted images, resulting in a large increase in work load.

SUMMARY OF THE INVENTION

The present invention has been made in consideration of the above situations, and has as its object to provide an information file processing apparatus and method capable of efficiently using a storage to accumulate an information file in the storage.

It is another object of the present invention to provide an information file processing apparatus and method capable of reproducing a large number of information files from a storage with a small capacity.

It is still another object of the present invention to provide an information file processing apparatus and method capable of largely reducing a work load in editing of an information file.

To achieve the above objects, according to the information file processing apparatus and method of the present invention, a plurality of version files are prepared for at least one specific file in a plurality of files designated by a sequence file which indicates the progress of the plurality of information files, and the plurality of files including a plurality of version files are recorded in a storage as one package together with the sequence file added with identification information for identifying each version. With this arrangement, a plurality of sequences which are conventionally accumulated as a plurality of packages can be accumulated as a single package. For this reason, the storage capacity of the storage for storing the plurality of version sequences can be largely reduced.

In addition, according to the information file processing apparatus and method of the present invention, a plurality of version files prepared for at least one specific file in a plurality of files described in a sequence file which describes the progress of the plurality of information files are selectively reproduced in accordance with identification information added in the sequence file. Therefore, a large number of file sequences can be reproduced from the storage with a small capacity.

Furthermore, according to the information file processing apparatus and method of the present invention, in formation of a sequence file for describing the progress of a plurality of information files, a main reproduction file is designated while sub-reproduction files to be reproduced together with the main reproduction file are designated. At the same time, the longest reproduction time among the sub-reproduction files is selected and notified, or the reproduction time of the main reproduction file is determined in accordance with the reproduction time. Therefore, the work load of an editor can be largely reduced.

BRIEF DESCRIPTION OF THE DRAWINGS

FIG. 2 is comprised of FIGS. 2A and 2B showing flow charts for explaining the operation of the system in FIG. 1, to which the present invention is applied;

FIG. 4 is comprised of FIGS. 4A and 4B showing flow charts of the operation of the system in FIG. 3 in reproduction of a file sequence including only a selected version file; and FIG. 5 is comprised of FIGS. 5A, 5B and 5C showing flow charts of the operation of the system in FIG. 3 in editing of the file sequence.

DETAILED DESCRIPTION OF THE PREFERRED EMBODIMENTS

An embodiment of the present invention will be described below with reference to the accompanying drawings.

Figure 1:
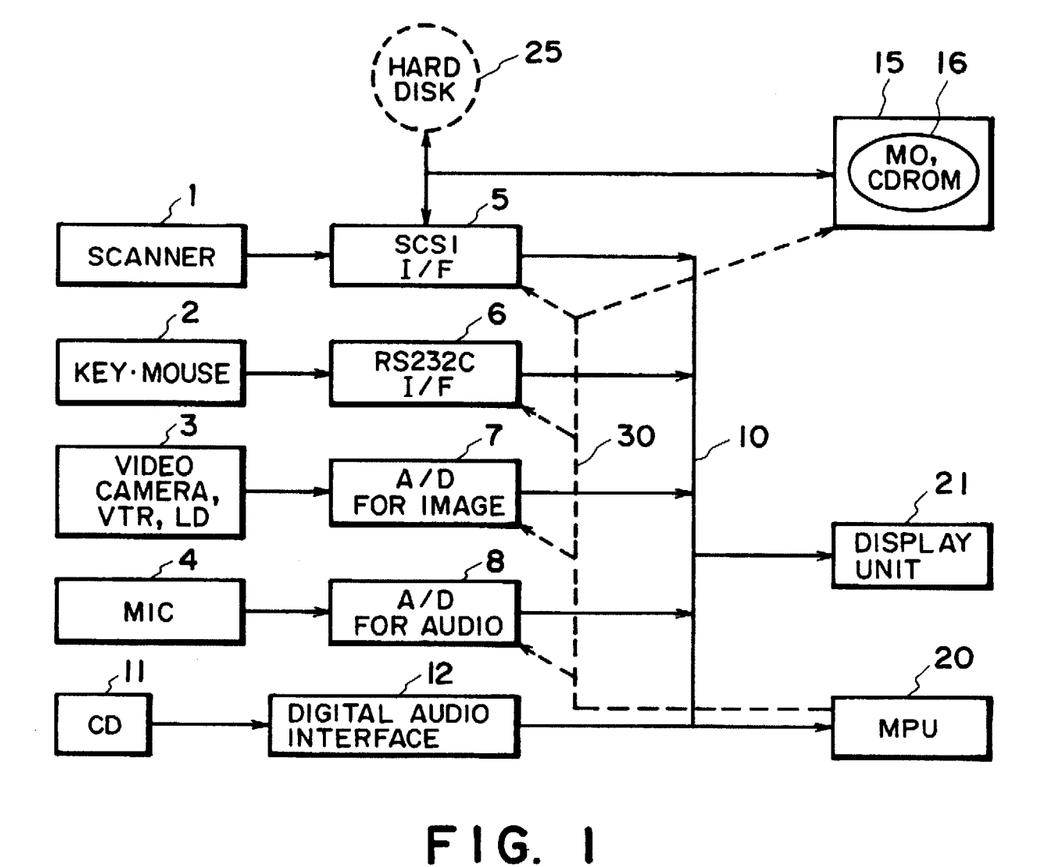
FIG. 1 is a block diagram showing the entire arrangement of an information file accumulation system according to an embodiment of the present invention.

FIG. 1 is a block diagram showing the overall arrangement of an accumulation system according to the embodiment of the present invention. Referring to FIG. 1, a scanner 1 extracts still image information. This still image information is captured by a data bus 10 through a SCSI interface 5. Character information or various operation commands generated by an operation unit 2 such as a keyboard and a mouse are input by the data bus 10 or a control bus 30 through an RS232C interface 6. An image generation source 3 such as a video camera, a VTR, or an LD (Laser Disk) generates an image signal. The generated image signal is captured by the data bus 10 through an A/D converter 7 for image. A microphone 4 generates an audio signal, and particularly, a narration audio signal. The generated audio signal is similarly input by the data bus 10 through an A/D converter 8 for audio.

A CD (Compact Disk Player) 11 generates a digital audio signal. This digital audio signal can be input by the data bus 10 through a digital audio interface 12. A recording unit 15 drives a storage with a small capacity, such as an MO and a CD-ROM, and writes signals therein. A small-capacity memory (package media) 16 such as an MO and a CD-ROM stores a packaged program. This system also includes a microprocessing unit (MPU) 20 and a hard disk 25 as a mass storage for storing a large number of material files.

In the following embodiment, a case will be exemplified in which a program described in a basic program sequence file as shown in Table 1 is to be recorded. Table 1 is as follows.

TABLE 1

| Lap Time | Command | Material File |
| --- | --- | --- |
| 0000.00 | read Disk | background music, title 1 |
| 0005.00 | read Disk | still picture 2, narration 2 |
| 0010.00 | read Disk | still picture 3, narration 3 |
| 0015.00 | read Disk | video 4, narration 4 |

The content of the program sequence file in Table 1 will be briefly described. In Table 1, the column "Lap Time" represents a lap time from the start of the program in units of seconds. Therefore, when reproduction is performed in accordance with the program sequence file in Table 1, reproduction of a background music (BGM) is started simultaneously with the start of reproduction of the program (after zero second), and "title 1" is displayed as title characters. After five seconds, "still picture 2" is displayed, and "narration 2" is reproduced and output.

After ten seconds from the start of reproduction, "still picture 3" is displayed, and "narration 3" is reproduced and output. After 15 seconds from the start of reproduction, "video 4" is reproduced and displayed, and at the same time, "narration 4" is reproduced and output.

Assume that multimedia program constituent element files as shown in Table 2 are present in the hard disk 25. For the descriptive convenience, the number of files is much smaller than that in actual system design. Characters next to "." will be referred to as an extension hereinafter.

TABLE 2

| Multimedia Constituent Element | Material File Name |
| --- | --- |
| BackGround Music | BGM |
| Narrations | narration 2 |
|  | narration 2.Japanese |
|  | narration 2.English |
|  | narration 3 |
|  | narration 3.Japanese |
|  | narration 3.English |
|  | narration 4 |
| Texts | title 1 |
|  | text 2 |
|  | text 2.Japanese |
|  | text 2.English |
| Still Picture | still picture 2 |
|  | still picture 3 |
| Videos | video 4 |

Figures 2, 2B:
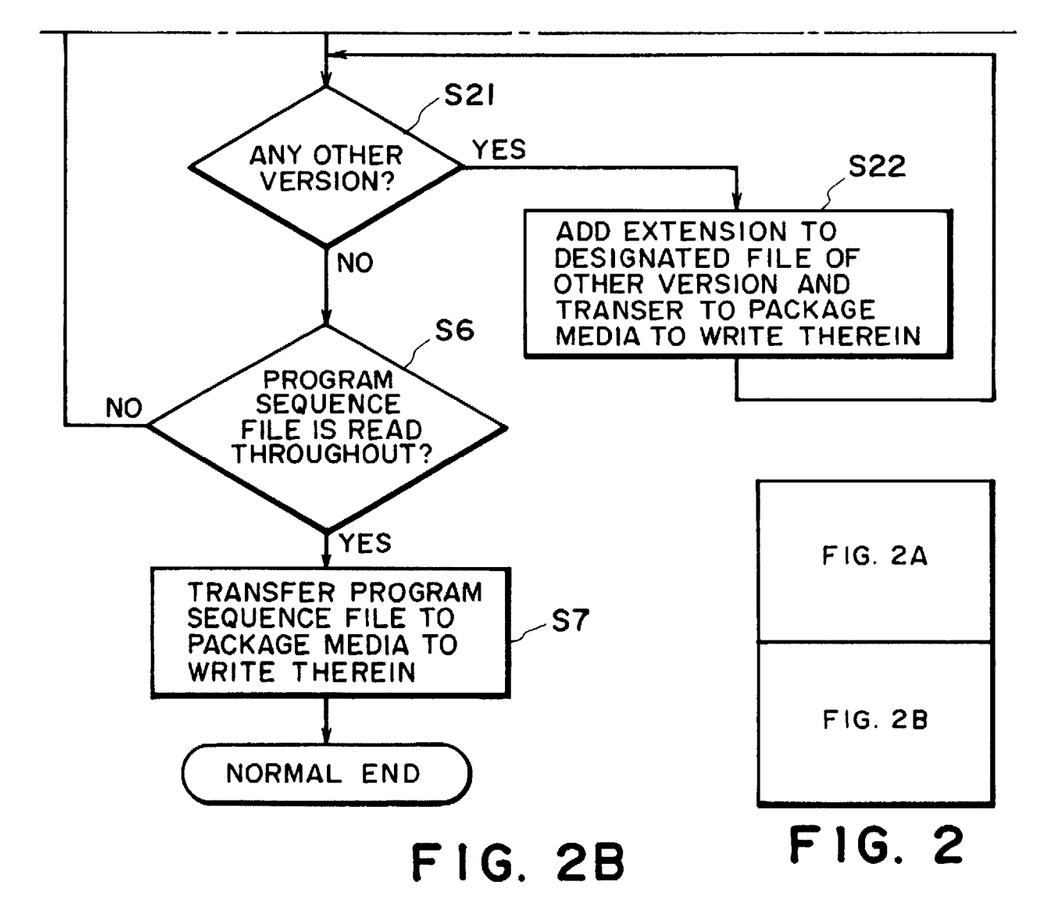
Figure 2A:
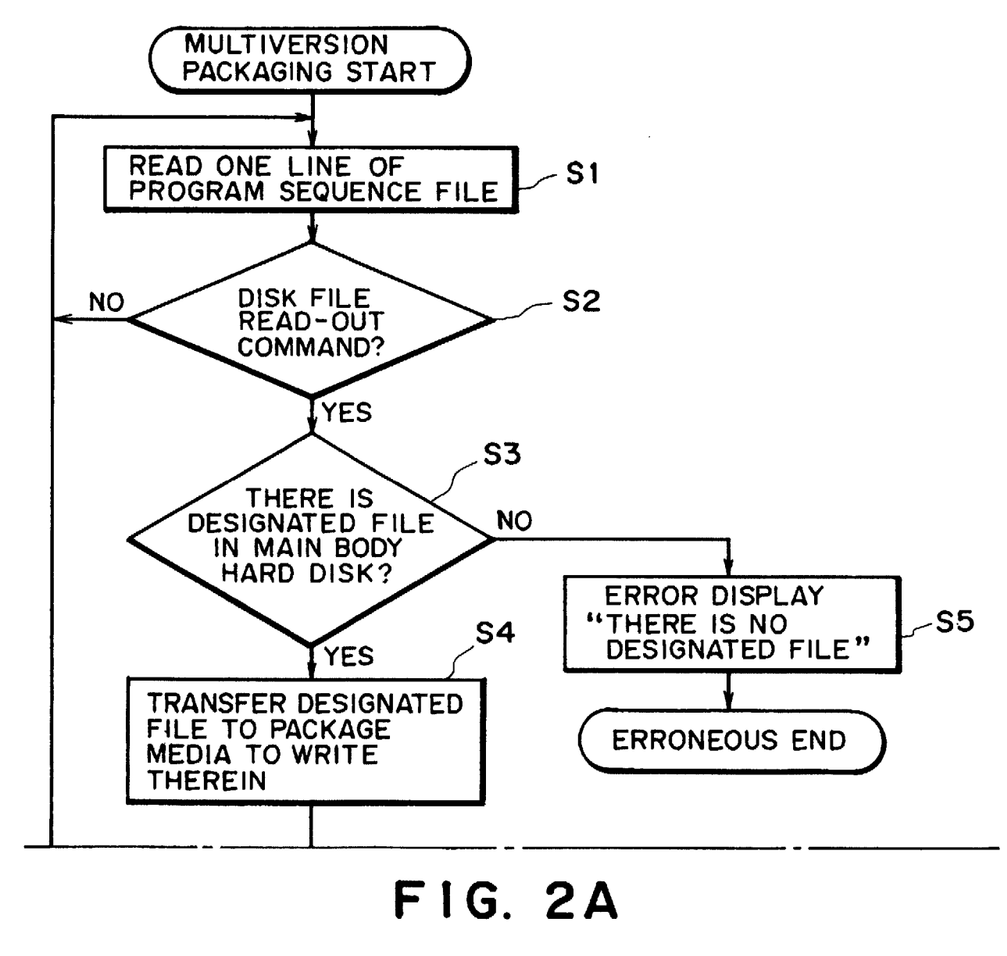

FIGS. 2A and 2B are flow charts for explaining the operation of the system in FIG. 1 according to an embodiment of the present invention, to which the present invention is applied. The operation of this system will be described below with reference to FIGS. 2A and 2B.

Upon reception of a command of "multiversion packaging start" from the operation unit 2, the MPU 20 reads one line of the program sequence file in accordance with the flow chart in FIG. 2A (step S1). More specifically, information "0000.00, read Disk, BGM, title 1" is read. This information is determined as a disk file read-out command (step S2). The designated material files, i.e., files "BGM" and "title 1" are searched from the hard disk 25, transferred to the package media 16, and written therein (step S4).

If the designated material files such as a still image, characters, an image, an audio, i.e., the files "BGM" and "title" are not present in the hard disk 25, it is determined that the designated files are not present (step S3). Since this is probably caused by an operator mistake, an error display such as "there is no designated file" is performed on the display unit 21 to call the operator's attention (step S5).

It is determined whether the written material files have any other version (step S21). If YES in step S21, the designated file of any other version is similarly searched from the hard disk 25 and written in the package media 16. In this case, the files "BGM" and "title 1" do not have any other version, and the flow advances to step S6.

In step S6, it is determined whether the program sequence file is completely read. In this case, the program sequence file is not completely read yet, and the flow returns to step S1 to read the next line of the program sequence file. When information "0005.00, read Disk, still picture 2, narration 2" is read, the designated files "still picture 2" and "narration 2" are searched from the hard disk 25, transferred to the package media 16, and written therein.

The file "narration 2" has a Japanese version and an English version while the file "still picture 2" has no version. Therefore, in step S22, files "narration 2.Japanese" and "narration 2.English" are transferred to the package media 16 and written therein together with extensions. The versions of the file "narration 2" have the same kind of information but different language attributes.

Similarly, the next line of the program sequence file, i.e., information "0010.00, read Disk, still picture 3, narration 3" is read. The designated files "still picture 3", and "narration 3" are searched from the hard disk 25, transferred to the package media 16, and written therein.

In this case as well, the file "narration 3" has a Japanese version and an English version while the file "still picture 3" has no version. Therefore, files "narration 3.Japanese" and "narration 3.English" are transferred to the package media 16 and written therein together with extensions.

If the program sequence file is read throughout in step S6, the flow advances to step S7 to transfer the program sequence file itself to the package media 16, thereby ending the processing.

According the above embodiment of the present invention, a file which is conventionally recorded in the package media as three packages is recorded as one package. Therefore, the storage capacity of the package media can be largely reduced. As for the actual capacity, a file having no version is accumulated only once so that the storage capacity can be saved accordingly. In addition, management of the package media can also be greatly facilitated.

The operation will be described in more detail. In a multimedia system compatible to a multilingual system, excellent image and music are common in all nations. However, a narration audio or explanatory characters are unique to each language system. Additionally, from the viewpoint of information amount, a narration audio has an information amount smaller than that of a BGM. For example, the information amounts are compared on the basis of the sampling rates or the like. Assume that the BGM is at the same level as that of a CD, the sampling frequency is 44.1 KHz, and the sampling signal is a 16-bit stereo signal, the information amount per unit time is 1.4112 Mbps (=16× 44100×2). On the other hand, the information amount of a narration audio signal is 176.4 kbps (=16×11025×1) when it is assumed that the sampling frequency is 11.025 KHz, and the sampling signal is a 16-bit monaural signal. Therefore, formation of another file for only narration results in a large waste from the viewpoint of information amount. When the system according to the embodiment of the present invention is used, the storage capacity can be largely saved.

To more effectively use the recording system of the present invention, the information amount of a narration audio can be compressed to almost ½ by using a known technique such as ADPCM.

The information amount of explanatory characters is also much smaller than that of a still image. For example, a still image signal of 512×768 true color (8-bit R, G, and B signals) has a very large information amount of 1.179648 Mbyte, which can be compressed to almost 1/10 by using a compression technique such as JPEG. On the other hand, about 200 characters can be displayed as characters for explanation or the like in a normal monitor. The 200 characters correspond to an information amount as large as about 4 kbyte even in Japanese which has the largest information amount. Therefore, when the system according to the above embodiment of the present invention need not prepare a file (package) dedicated to explanation, the storage capacity can be similarly largely reduced.

A case in which the package accumulated in the package media is to be actually reproduced will be described below.

Figure 3:
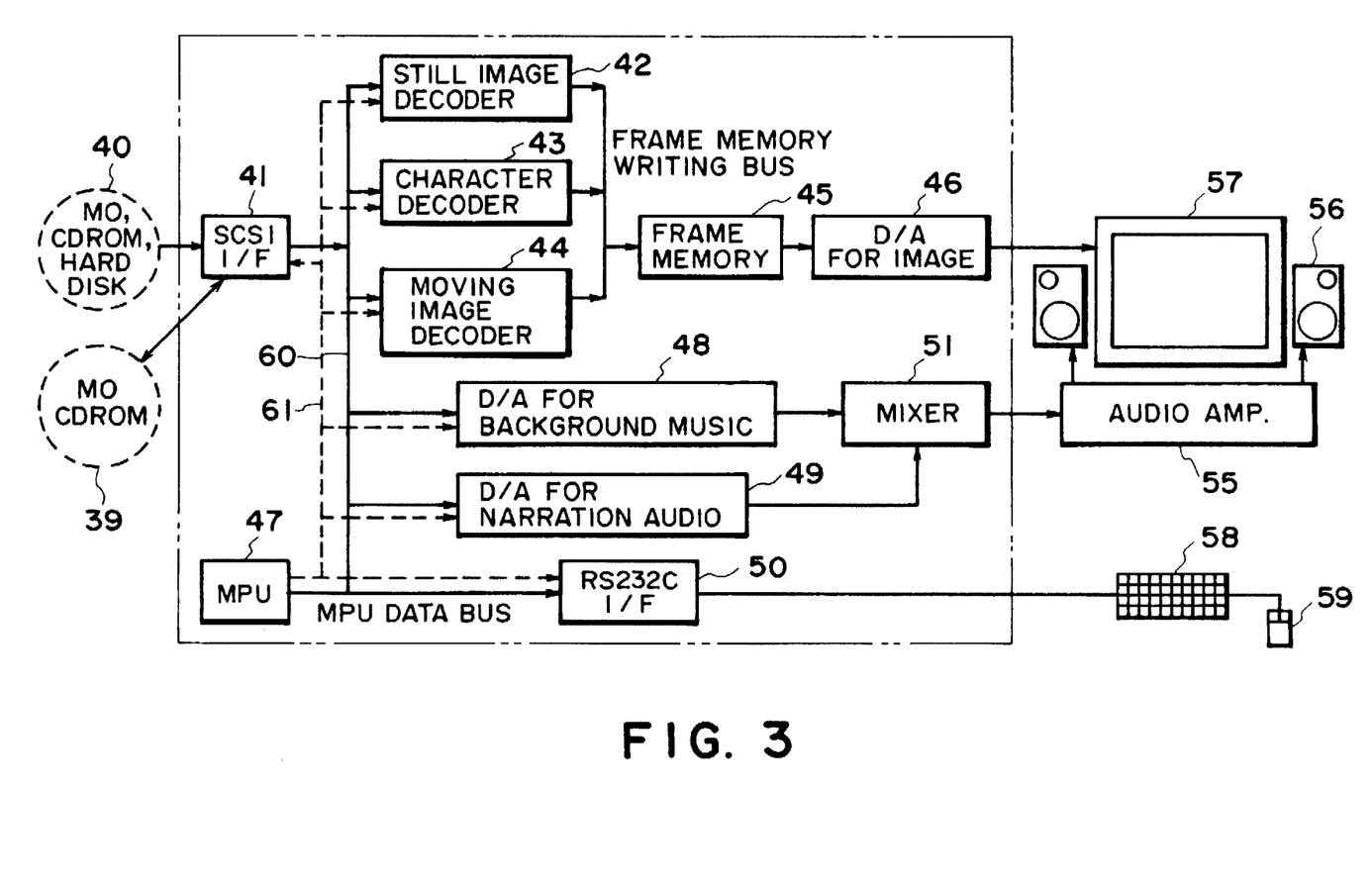
FIG. 3 is a block diagram showing the entire arrangement of a system for reproducing or editing a recorded information file.
Figures 4, 4B:
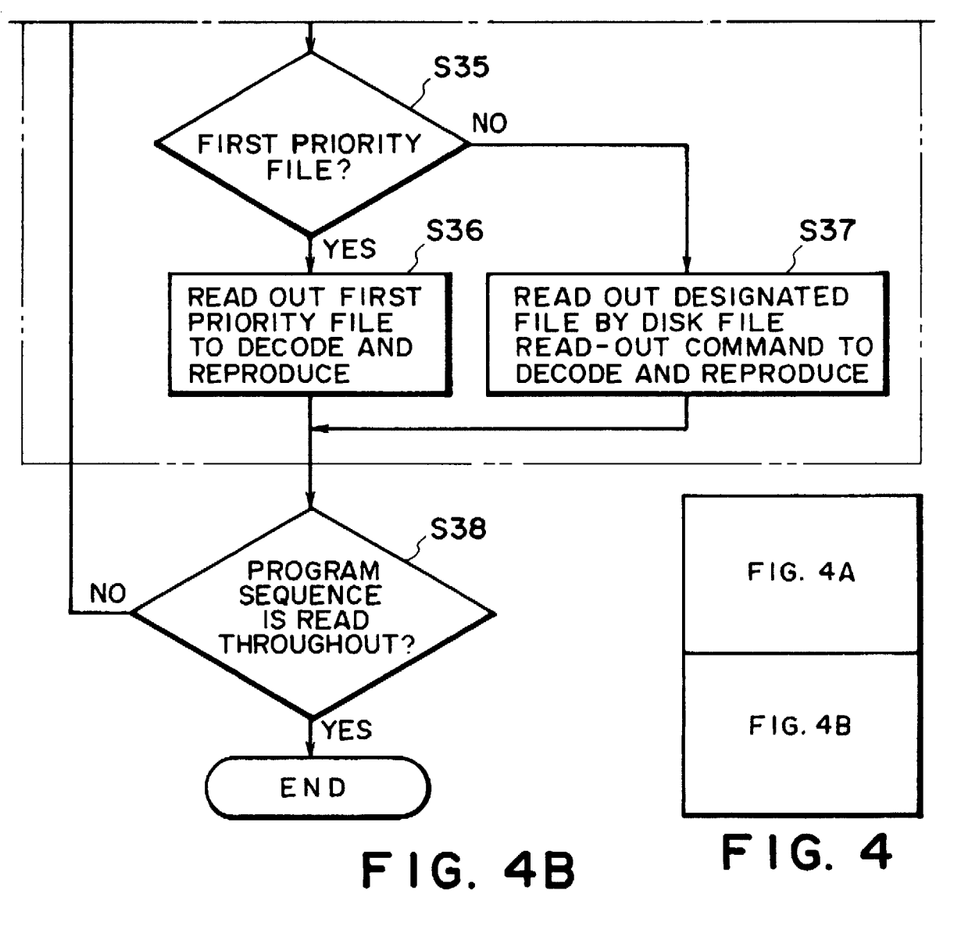
Figure 4A:
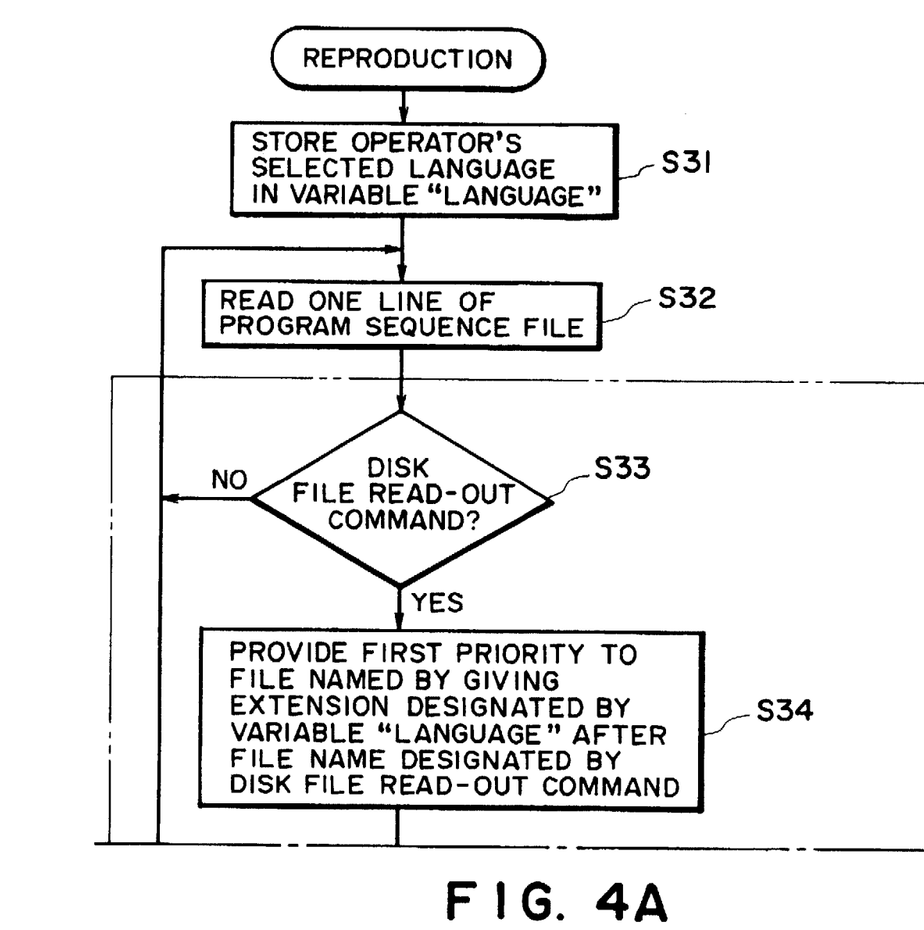

FIG. 3 is a block diagram showing the arrangement of a reproduction or editing system for reproducing or editing the package recorded in the above manner. FIGS. 4A and 4B are flow charts for explaining the operation of the system in FIG. 3 in reproduction of the program of only the selected version.

Referring to FIG. 3, the system includes a storage 40 such as a package medium and a hard disk, a SCSI interface 41 for performing data transfer between the storage 40 and data and control buses 60 and 61, a still image decoder 42, connected to the data bus 60, for decoding still image information, a character decoder 43 for decoding character information, an image decoder 44 for decoding an image signal, a frame memory 45 for synthesizing image information reproduced by the decoders 42 to 44 or repeatedly displaying the image information on a monitor 57, a D/A converter 46 for converting an output from the frame memory 45 into an analog signal, a microprocessing unit (MPU) 47, a D/A converter 48 for background music, a D/A converter 51 for narration audio, an RS232C interface 50, a mixer 51 for synthesizing audio signals output from the D/A converters 48 and 49, an audio amplifier 55, loudspeakers 56, the monitor 57, and an operation unit such as a mouse 59 and a keyboard 58.

An operation for reproducing a file associated with a designated language will be described below with reference to the flow charts in FIG. 4A and 4B. Upon reception of a command for reproducing a desired package from the operation unit, a language designated by the operation unit is stored in a variable (LANGUAGE) in step S31. In this case, assume that "Japanese" is stored in the variable (LANGUAGE). In step S32, one line ("0000.00, read Disk, BGM, title 1") of the sequence program file for the package to be reproduced by the MPU 47 is read. This information is determined as a disk file read-out command (step S33), and the flow advances to step S34. The language name (Japanese) stored in the above variable (LANGUAGE) is added to the designated file names (BGM, title 1) as an extension, and the files are searched. More specifically, two files "BGM.Japanese" and "title 1.Japanese" are searched as first priority files.

In step S35, the presence/absence of these files is determined. In this case, neither the file "BGM.Japanese" nor the file "title 1.Japanese" are present. Therefore, only files with file names (BGM, title 1) defined in the program sequence file are searched and read out from the package media or the storage 40 such as a hard disk (step S37). As for the BGM, the file is transferred to the D/A converter 48 for BGM, thereby starting reproduction of the BGM (output from the loudspeakers 56). The file "title 1" is read out and transferred to the character decoder 43, thereby displaying the "title 1" on the monitor 57.

The MPU (sequencer) 47 reads out the next line ("0005.00, read Disk, still picture 2, narration 2") (step S32). In step S34, files (still picture 2.Japanese, narration 2.Japanese) having file names (still picture 2, narration 2) with an extension (Japanese) are searched. The file "narration 2.Japanese" is present although the file "still picture 2.Japanese" is not present. Therefore, the file "narration 2.Japanese" is transferred to the D/A converter 49 for narration audio after five seconds which is defined in this line (step S36), and at the same time, the file "still picture 2" is supplied to the still image decoder 42 (step S37), thereby starting reproduction of the still image and reproduction of the narration audio.

The lap time in the next line of the program sequence file is ten seconds. Therefore, after ten seconds from the start of reproduction, files (still picture 3.Japanese, narration 3.Japanese) having file names (still picture 3, narration 3) with an extension (Japanese) are searched. The file "still picture 3" is displayed, and the file "narration 3.Japanese" is reproduced. If any other line of the program sequence file is present, the similar processing is performed for the next line. When the program sequence file is read throughout (step S38), the processing is ended.

With the above arrangement, only files using a language version to be reproduced are preferentially reproduced from the package. If the designated version is not present, files defined in the program sequence file are read out, thereby reproducing a complete program.

In the above embodiment, only a narration or characters have language versions. However, a still image can also have a plurality of versions. For example, a plurality of files of national flags are prepared. When a plurality of files of flags of a country using the designated language are prepared, and an extension corresponding to the country is added, the flag of the country using the language designated to be reproduced by the operator can be automatically displayed. As for an image, various version files can also be prepared.

When data of the multimedia program constituent element files including a still image, characters, an image, a narration audio, and a BGM are compressed, these data are expanded in the blocks in FIG. 3 indicated as the still image decoder 42, the character decoder 43, the moving image decoder 44, and the D/A converter 49 for narration audio, respectively.

As described above, in the system of the above embodiment, a plurality of files including a plurality of version files are recorded in the storage as one package together with the program sequence file added with identification information for identifying each version. With this arrangement, a plurality of programs which are conventionally accumulated as a plurality of packages can be accumulated as a single package. For this reason, the storage capacity of the storage for storing the plurality of version programs can be largely reduced.

In addition, in the system of another embodiment of the present invention, a plurality of version files prepared for at least one specific file in a plurality of files described in the program sequence file which describes the progress of a multimedia program are selectively reproduced in accordance with the identification information added in the program sequence file. Therefore, a large number of multimedia programs can be reproduced from the storage with a small capacity.

An information file editing system as another embodiment of the present invention will be described below in detail.

Figures 5, 5C:
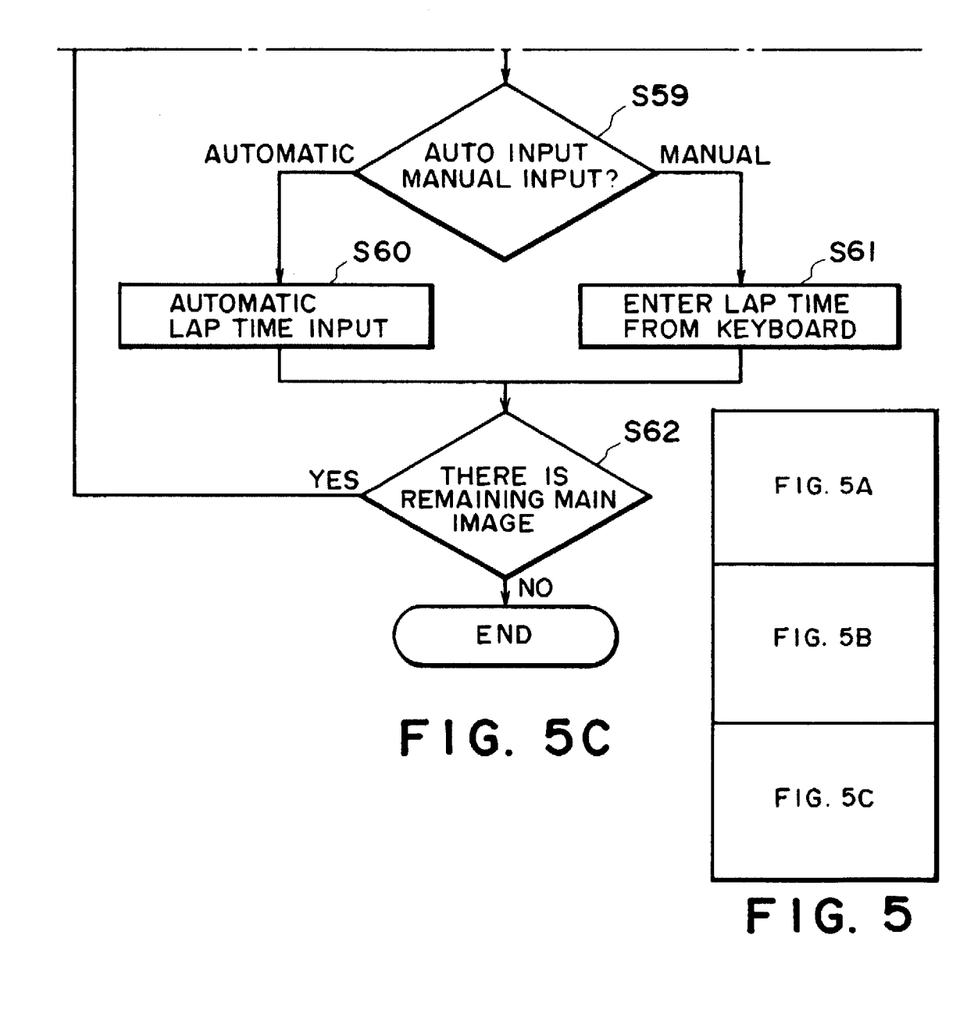
Figure 5A:
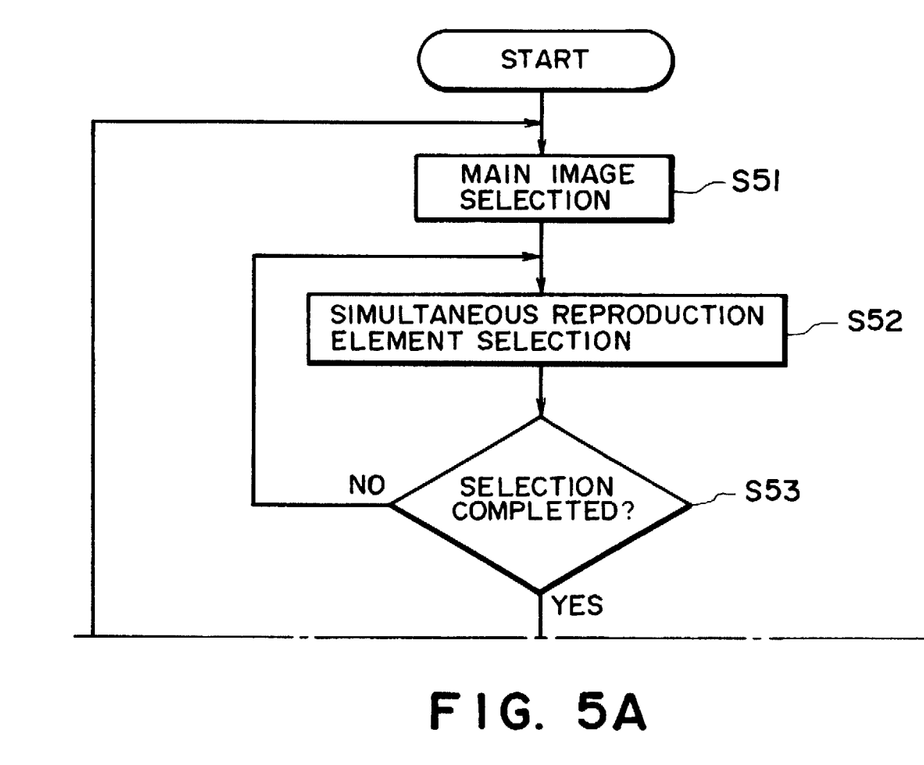
Figure 5B:
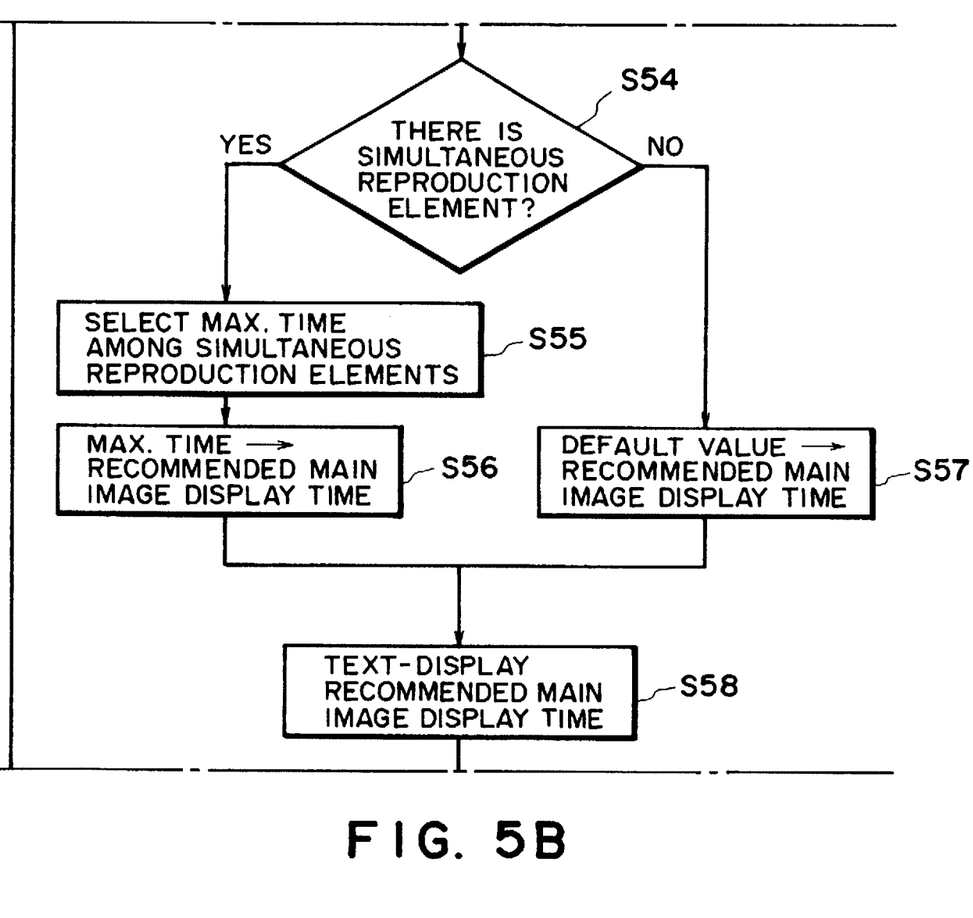

FIGS. 5A, 5B and 5C are flow charts for explaining an operation for forming (editing) the package media of the system shown in FIG. 3. The operation for forming the program sequence file (scenario) will be described below with reference to the flow charts in FIGS. 5A, 5B and 5C.

For the description of this embodiment, assume that multimedia program constituent element files as shown in Table 3 are stored in the hard disk 40 in advance. As is apparent from Table 3, the types of the multimedia constituent element files are determined by first several characters of the file names. Differences in contents of these files are discriminated by a suffix such as "1" and "2". The time (reproduction time) required to reproduce each file is indicated subsequent to ";" in units of seconds.

In the system in FIG. 3, communication from the operator to the system is achieved by inputting information from the keyboard 58 or the mouse 59 in FIG. 3 and transmitting the input information to the MPU 47 through the RS232C interface 50. As for communication from the system to the operator, the MPU 47 controls the decoders 42 to 44, and the image to be reproduced is displayed on the monitor 57 through the frame memory 45 and the D/A converter 46 for image. Therefore, the operator can confirm the operation.

TABLE 3

| Multimedia Constituent Element | Material File Name |
|---|---|
| Still Images | still picture 1 |
| | still picture 2 |
| | still picture 3 |
| | still picture 4 |
| Characters | text 5.Japanese; 1.50 |
| | text 5.English; 2.00 |
| Moving Images | video 4; 5.00 |
| | video 5 |
| BGM | BGM; 25.00 |
| Narrations | narration 2.Japanese; 4.00 |
| | narration 2.English; 5.00 |

In step S51 in FIG. 5A, the main display image is selected. The MPU 47 issues an image file output request to the SCSI interface 41. The plurality of image files stored in the hard disk 40 are temporarily read in the MPU 47 through the SCSI interface. In the MPU 47, reduction processing and address processing are performed, and the image files are supplied to the still image decoder 42 as a multi-windows corresponding to the plurality of image files. The decoded still image signal is stored in the frame memory 45. The signal read out from the frame memory 45 is supplied to the monitor 57 through the D/A converter 46 for image, and the multi-image screen representing the contents of the plurality of still image files accumulated in the hard disk 40 is displayed.

The operator selects an image to be output first from the multi-windows on the monitor 57 by using the mouse 59. The selected image file name is written in the program sequence file in the MPU 47. In this case, the material file "still picture 1" is selected.

In step S52 in FIG. 5A, multimedia constituent element files to be reproduced together with the main image selected in step S51 are temporarily read in the MPU 47 through the SCSI interface 41. The list of the multimedia constituent element files is formed in the MPU 47 as a text, output to the character decoder 43, and output onto the monitor 57 through the frame memory 45 and the D/A converter 46 for image as a list for selecting the multimedia program constituent elements. The operator inputs the names of the multimedia program constituent element files from the keyboard 58. If narration or character files in two or more languages are present as explanations, these files are described together on the program sequence file and selected by the operator in reproduction. Therefore, in this case, narration file names and character file names in all languages to be combined with the main image are input. More specifically, in step S53, it is checked whether all file names to be selected are input. If any file is not input, the flow returns to step S52.

The file names of the selected multimedia constituent element files are added to the first line of the program sequence file in the MPU 47 with a comma ",". In this case, the file "BGM; 25.00" is selected. Therefore, the program sequence file at this time is represented as in Table 4.

TABLE 4

| Lap Time | Command | Material File |
|---|---|---|
| 0000.00 | read Disk | still picture 1, BGM; 25.00 |

The start time of the main image to be subsequently reproduced in the program is edited. In step S54 in FIG. 5B, it is checked whether there is the multimedia constituent elements selected in steps S52 and S53. More specifically, if the operator has selected certain multimedia constituent elements in the processing of steps S52 and S53, the MPU 47 in FIG. 3 determines as "YES". If information representing that there is no multimedia constituent element to be reproduced together with the main image is input in step S52 in FIG. 5A, it is determined as "NO".

In this embodiment, the file "BGM; 25.00" is input as a multimedia element to be simultaneously reproduced. Therefore, it is determined as "YES", and the flow advances to step S55. In step S55, if there are a plurality of multimedia constituent elements to be simultaneously reproduced by the MPU 47, the file reproduction times described on the left side of ";" in the multimedia constituent element files are checked. A file with the longest reproduction time is extracted from the multimedia constituent element files to be simultaneously reproduced in reproduction of one main image.

In this case, since there is no other multimedia program constituent element file to be simultaneously reproduced, and only the file "BGM; 25.00" is to be simultaneously reproduced, the time "25 seconds" is extracted, and the flow advances to step S56 in FIG. 5B. In step S56, the MPU 47 stores the maximum time among the multimedia program constituent elements, which is extracted in step S55, as a recommended main image display time. In step S58, this information is supplied from the MPU 47 to the character decoder 43 as character information. This information is supplied to the monitor 57 through the frame memory 45 and the D/A converter 46 for image. The above recommended image display time is displayed on the monitor 57.

The operator confirms this display time. If the operator is not satisfied with the recommended image display time, the operator inputs a command for manually designating the display time. A case in which the time is to be manually displayed will be described below. In this case, the flow advances to step S61 to manually input the main image display time from the keyboard 58. Since the BGM must be continuously reproduced throughout the program, the length of the file of the BGM is neglected, and a time "five seconds" is input to give a priority to the reproduction time of the file "still picture 1". Therefore, the content in the program sequence file in the MPU 47 at this time is represented by Table 5.

In step S62, a prompt whether there is a remaining main image to be added to the monitor 57 is displayed, thereby requesting confirmation from the operator. If the operator inputs data representing that there is a remaining main image to be added in step S62, the flow returns to step S51. If the operator inputs data representing that there is no remaining main image to be added, the processing is ended.

TABLE 5

| Lap Time | Command | Material File Name |
|---|---|---|
| 0000.00 | read Disk | still picture 1, BGM; 25.00 |
| 0005.00 | | |

In step S51, the next main image is selected. In this case, the operator selects the still image file "still picture 2" by using the mouse 59. The operator also selects the narration files "narration 2.Japanese; 4.00" and "narration 2.English; 5.00", in which the explanation of the still image "still picture 2" is stored, from the keyboard 58 as multimedia program constituent elements to be reproduced together with the still image file "still picture 2". The program sequence file in the MPU 47 at this time is represented by Table 6.

TABLE 6

| Lap Time | Command | Material File Name |
|---|---|---|
| 0000.00 | read Disk | still picture 1, BGM; 25.00 |
| 0005.00 | read Disk | still picture 2, narration 2.Japanese; 4.00, narration 2.English; 5.00 |

In this case as well, it is determined in step S54 that there are multimedia constituent elements to be reproduced together with the main image. In step S55, the longer reproduction time between the two multimedia program constituent elements "narration 2.Japanese; 4.00" and "narration 2.English; 5.00" is selected as a recommended main image display time. That is, the time "five seconds" is selected and displayed as the recommended main image display time.

If the operator inputs an intention representing that he/she is satisfied with this display time, the flow advances to step S60 to automatically register the time "five seconds" as the display continuous time of the program sequence file in the MPU 47. The program sequence file at this time is represented by Table 7.

TABLE 7

| Lap Time | Command | Material File Name |
|---|---|---|
| 0000.00 | read Disk | still picture 1, BGM; 25.00 |
| 0005.00 | read Disk | still picture 2, narration 2.Japanese; 4.00 narration 2.English; 5.00 |
| 0010.00 | | |

An operation associated with step S57 in the flow chart of FIG. 5B will be described below. After formation of the program sequence file shown in Table 7, the flow returns to step S51. Assume that there is a remaining main image to be displayed, and the still image file "still picture 3" is selected. In addition, assume that, in steps S52 and S53, data representing that there is no remaining multimedia program constituent element to be displayed together with the still image file "still image 3" is input. The program sequence file at this time is represented by Table 8.

In step S54, it is confirmed that there is no multimedia program constituent element to be simultaneously reproduced, and the flow advances to step S57.

TABLE 8

| Lap Time | Command | Material File Name |
|---|---|---|
| 0000.00 | read Disk | still picture 1, BGM; 25.00 |
| 0005.00 | read Disk | still picture 2, narration 2.Japanese; 4.00 narration 2.English; 5.00 |
| 0010.00 | read Disk | still picture 3 |

In step S57, since there is no multimedia program constituent element as a basis for determination of the recommended main image display time, a default value (minimum display time) of three seconds is set as the recommended main image display time. In step S58, the recommended time is displayed. In step S59, manual input is selected. In step S61, the time "five seconds" is input from the keyboard 58.

A file "still picture 4" is selected as the next main image file to be reproduced. In addition, as a multimedia program constituent element to be displayed together with the still image file "still picture 4", an image file "video 4" associated with this still image is selected. The reproduction time of this image file, i.e., a time "five seconds" is set as the reproduction time of the still image file "still picture 4", thereby ending the processing. The program sequence file in the MPU 47 at this time is represented by Table 9.

In this embodiment, as described above, the maximum reproduction time among the reproduction times of the subfiles to be reproduced together with the main still image file is displayed as the recommended reproduction time. For this reason, the lap time setting operation in determination of the program sequence file is facilitated. In addition, since the lap time can be automatically set as needed, an efficient operation can be performed.

In the above embodiment, the still image file is set as the main reproduction file, and the image and audio files are set as the sub-reproduction files. However, the image file can also be set as the main file while the audio and still image files can be set as the subfiles, as a matter of course. The present invention can be applied to achieve the efficient operation.

TABLE 9

| Lap Time | Command | Material File Name |
|---|---|---|
| 0000.00 | read Disk | still picture 1, BGM; 25.00 |
| 0005.00 | read Disk | still picture 2, narration 2.Japanese; 4.00 narration 2.English; 5.00 |
| 0010.00 | read Disk | still picture 3 |
| 0010.00 | read Disk | still picture 4, video 4; 5.00 |
| 0010.00 | End | |

As has been described above, according to the information file processing apparatus and method of this embodiment, a main reproduction file is designated while sub-reproduction files to be reproduced together with the main reproduction file are designated. At the same time, the longest reproduction time among the sub-reproduction files is selected and notified, or the reproduction time of the main reproduction file is determined in accordance with the reproduction time. Therefore, the work load of an editor can be largely reduced.

What is claimed is:

1. An information file processing apparatus for packaging a plurality of information files described in a sequence file which indicates a progress of packaged files and storing them with the sequence file in a single storage media, comprising:

(a) means for providing a video file and a plurality of different versions of an audio file designated by the sequence file, said plurality of versions of the audio file having different kinds of attributes;

(b) addition means for adding identification information for identifying the plurality of versions of the audio file to the sequence file; and (c) packaging means for packaging the video file, the plurality of versions of the audio file and the sequence file added with the identification information as one package.

2. An apparatus according to claim 1, wherein the plurality of versions of the audio file use different languages.

3. An information file processing method in which a plurality of information files described in a sequence file which indicates a progress thereof are packaged and the packaged files are stored with the sequence file in a single storage media, comprising the steps of:

providing a plurality of different versions of an audio file designated by the sequence file and a video file, said plurality of versions of the audio file having different kinds of attributes; and packaging the video file and the plurality of versions of the audio file in the storage as one package together with the sequence file including identification information for identifying the plurality of versions of the audio file.

4. A method according to claim 3, wherein the plurality of versions of the audio file use different languages.

5. An apparatus for reproducing a plurality of files from a single storage media in which the plurality of files described in a sequence file indicating a progress of the plurality of files are stored in units of packages, comprising:

(a) extraction means for extracting identification information for identifying a plurality of versions of an audio file in the plurality of files from the sequence file, said plurality of versions having different kinds of attributes; and (b) reproduction means for selectively reproducing the plurality of versions of the audio file in accordance with the identification information together with a video file which is packaged with plurality of versions of the audio file.

6. An apparatus according to claim 5, wherein the plurality of versions of the audio file use different languages.

7. An apparatus according to claim 6, further comprising designation means for designating one of the plurality of versions of the audio file, and wherein said reproduction means preferentially reproduces the version designated by said designation means from among the plurality of versions of the audio file with a single video file.

8. An apparatus according to claim 7, wherein, when the version designated by said designation means is not stored in the storage, said reproduction means reproduces another version of the audio file.

13

9. A method of reproducing a plurality of files from a single storage media in which the plurality of files described in a sequence file indicating a progress of the plurality of files are stored in units of packages, comprising the steps of:

extracting identification information for identifying a plurality of versions of a audio file included in the plurality of files from the sequence file, said plurality of versions having different kinds of attributes; and selectively reproducing the plurality of versions of the audio file in accordance with the identification information together with a video file which is packaged with the plurality of versions of the audio file.

10. An information file processing apparatus for forming a sequence file indicating a progress of a plurality of information files, comprising:

(a) first designation means for designating a main reproduction file;

(b) second designation means for designating a plurality of sub-reproduction files one of which is to be reproduced together with the main reproduction file; (c) detecting means for detecting reproduction periods of time for the sub-reproduction files; and (d) notification means for selecting a longest reproduction period of time among the reproduction periods of time detected by said detecting means and notifying an editor of the longest reproduction period of time.

11. An apparatus according to claim 10, further comprising third designation means for designating the reproduction period of time of the main reproduction file.

12. An apparatus according to claim 11, wherein said third designation means automatically determines the reproduction period of time of the main reproduction file in accordance with the longest reproduction period of time notified by said notification means.

13. An apparatus according to claim 10, wherein the main reproduction file is a still image information file, and said second designation means designates a moving image information file as the sub-reproduction file.

14. An apparatus according to claim 10, wherein the main reproduction file is a still image information file, and said second designation means designates an audio information file as the sub-reproduction file.

15. An apparatus according to claim 10, wherein said notification means displays the longest reproduction period of time on a display.

16. An information file processing apparatus for forming a sequence file indicating a progress of a plurality of information files, comprising:

(a) first designation means for designating a main reproduction file;

14

(b) second designation means for designating a plurality of sub-reproduction files one of which is to be reproduced together with the main reproduction file;

(c) detecting means for detecting reproduction periods of time of the sub-reproduction files; and (d) third designation means for selecting a longest reproduction period of time among the reproduction periods of time detected by said detecting means and automatically designating the reproduction period of time of the main reproduction file in accordance with the longest reproduction period of time.

17. An apparatus according to claim 16, wherein the main reproduction file is a still image information file, and said second designation means designates a moving image information file as the sub-reproduction file.

18. An apparatus according to claim 16, wherein the main reproduction file is a still image information file, and said second designation means designates an audio information file as the sub-reproduction file.

19. An information file processing method comprising the steps of:

(a) designating a main reproduction file;

(b) designating a plurality of sub-reproduction files one of which is to be reproduced together with the main reproduction file;

(c) detecting reproduction periods of time of the sub-reproduction files;

(d) selecting a longest reproduction period of time among the reproduction periods of time detected by said detecting step; and (e) notifying an editor of the longest reproduction period of time.

20. An information file processing method comprising the steps of:

(a) designating a main reproduction file;

(b) designating a plurality of sub-reproduction files one of which is to be reproduced together with the main reproduction file;

(c) detecting reproduction periods of time of sub-reproduction files;

(d) selecting a longest reproduction period of time among the reproduction periods of time detected by said detecting step; and (e) automatically determining the reproduction time of the main reproduction file in accordance with the longest reproduction period of time.

* * * * *